US012685939B2

(12) United States Patent
Benedetto et al.

(10) Patent No.: US 12,685,939 B2
(45) Date of Patent: Jul. 21, 2026

(54) CASCADING THROUGHOUT AN IMAGE DYNAMIC USER FEEDBACK RESPONSIVE TO THE AI GENERATED IMAGE

(71) Applicant: Sony Interactive Entertainment Inc., Tokyo (JP)

(72) Inventors: Warren Benedetto, San Mateo, CA (US); Michael Taylor, San Bruno, CA (US); Jon Webb, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/166,413

(22) Filed: Feb. 8, 2023

(65) Prior Publication Data

US 2024/0264718 A1     Aug. 8, 2024

(51) Int. Cl.
| | |
|---|---|
| *G06T 11/60* | (2026.01) |
| *G06F 3/0482* | (2013.01) |
| *G06F 3/04845* | (2022.01) |
| *G06T 11/00* | (2006.01) |
| *G10L 15/18* | (2013.01) |

(52) U.S. Cl.
CPC ........ *G06F 3/0482* (2013.01); *G06F 3/04845* (2013.01); *G06T 11/00* (2013.01); *G06T 11/60* (2013.01); *G10L 15/18* (2013.01); *G06T 2200/24* (2013.01)

(58) Field of Classification Search
CPC .... G06F 3/0482; G06F 3/04845; G06T 11/00; G06T 2200/24; G10L 15/18
See application file for complete search history.

(56) References Cited

U.S. PATENT DOCUMENTS

| | | | |
|---|---|---|---|
| 10,790,056 B1 * | 9/2020 | Accomazzi | ........... G06T 11/008 |
| 11,119,762 B1 * | 9/2021 | Bush | ................... G06F 11/3612 |
| 2019/0250795 A1 * | 8/2019 | Weldemariam | ....... G06F 3/0483 |
| 2020/0242774 A1 | 7/2020 | Park et al. | |
| 2021/0357682 A1 * | 11/2021 | Route | ................ G06F 18/2155 |
| 2022/0108417 A1 * | 4/2022 | Liu | ....................... G06T 1/0007 |

(Continued)

OTHER PUBLICATIONS

Avrahami_Blended_Diffusion_for_Text-Driven_Editing_of_Natural_Images_CVPR_2022_paper (Year: 2022).*

(Continued)

*Primary Examiner* — Beau D Spratt
(74) *Attorney, Agent, or Firm* — Kilpatrick Townsend & Stockton LLP

(57) ABSTRACT

A method including generating an image using an image generation artificial intelligence system configured for implementing latent diffusion, wherein the image is decoded from a latent space representation. The method including receiving selection of a portion of the image. The method including receiving commentary of a user corresponding to the portion of the image. The method including generating a text prompt to modify the portion of the image based on the commentary. The method including encoding the portion of the image using latent diffusion based on the text prompt. The method including modifying the latent space representation of the image using latent diffusion to generate a modified image, wherein the text prompt and the encoded portion of the image are provided as input to the image generation artificial intelligence system.

20 Claims, 7 Drawing Sheets

(56) References Cited

U.S. PATENT DOCUMENTS

| 2022/0122308 | A1* | 4/2022 | Kalarot | ................... | G06T 11/60 |
|---|---|---|---|---|---|
| 2022/0309633 | A1* | 9/2022 | Davies | ................... | G06V 10/82 |
| 2023/0118966 | A1* | 4/2023 | Liu | ......................... | G10L 13/02 |
| | | | | | 345/473 |
| 2023/0237718 | A1* | 7/2023 | Philip | ...................... | G06T 7/50 |
| | | | | | 345/426 |
| 2024/0169500 | A1* | 5/2024 | Zheng | ...................... | G06T 5/77 |
| 2024/0169622 | A1* | 5/2024 | Xie | ......................... | G06T 11/00 |
| 2024/0362757 | A1* | 10/2024 | Amirghodsi | .............. | G06T 5/60 |

OTHER PUBLICATIONS

PCT Intl. Search Report and The Written Opinion PCT/US2024/013009, Dated Jul. 2, 2024, Total 8 pages.
Robin Rombach et al.: "High Resolution Image Synthesis with Latent Diffusion Models", Ludwig Maximilian University of Munich & IWR, Heidelberg University, Germany/Runway ML, Apr. 13, 2022 (Apr. 13, 2022), XP091196342, Retrieved from the Internet: URL:https://arxiv.org/pdf/2112.10752 [retrieved on May 23, 2024]abstract point 1 "Introduction" point 4.3 "Confitional Latent Diffusion".

* cited by examiner

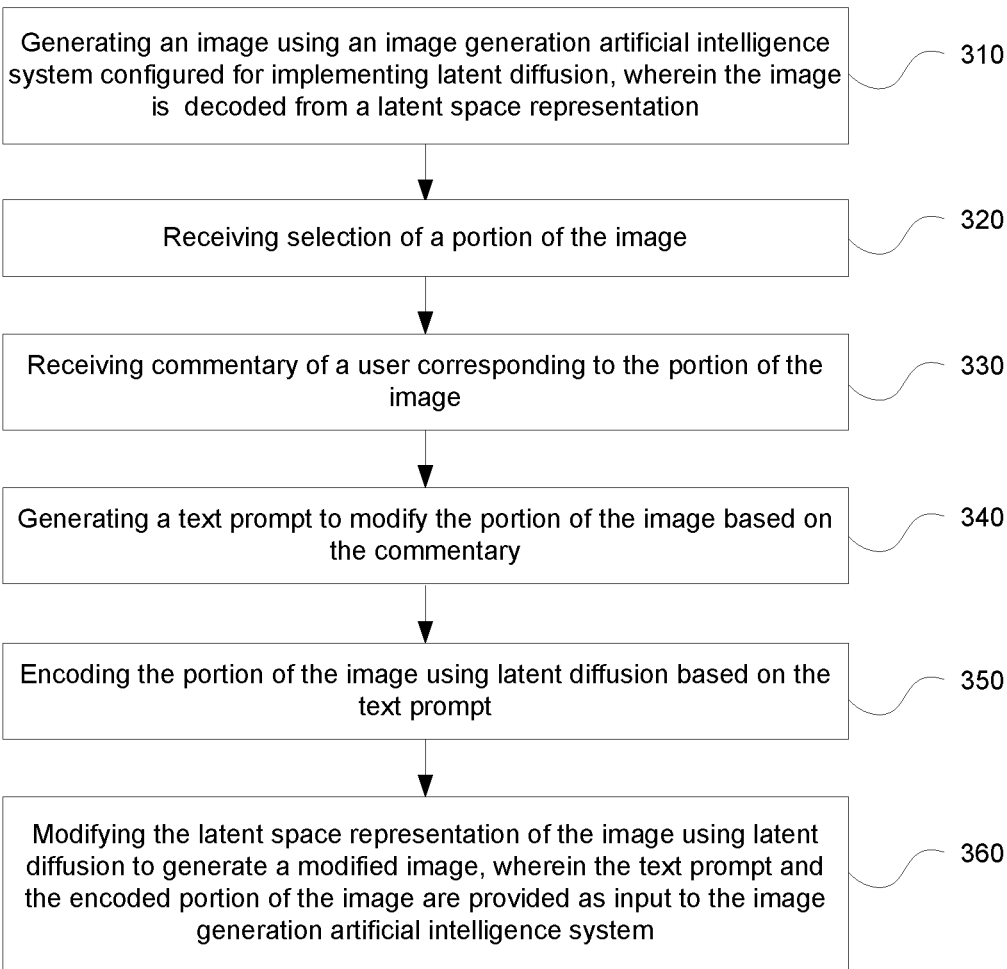

300

Generating an image using an image generation artificial intelligence system configured for implementing latent diffusion, wherein the image is decoded from a latent space representation — 310

Receiving selection of a portion of the image — 320

Receiving commentary of a user corresponding to the portion of the image — 330

Generating a text prompt to modify the portion of the image based on the commentary — 340

Encoding the portion of the image using latent diffusion based on the text prompt — 350

Modifying the latent space representation of the image using latent diffusion to generate a modified image, wherein the text prompt and the encoded portion of the image are provided as input to the image generation artificial intelligence system — 360

CASCADING THROUGHOUT AN IMAGE DYNAMIC USER FEEDBACK RESPONSIVE TO THE AI GENERATED IMAGE

TECHNICAL FIELD

The present disclosure is related to image generation, such as during development of a video game, and more specifically to enabling modification to an image generated using an artificial intelligence image generation model via commentary by a user providing feedback, wherein the commentary may be provided in natural language format, or by communicating likes and/or dislikes. The feedback provides for tuning of the image by forcing or guiding the artificial intelligence image generation model to a specific, desired outcome.

BACKGROUND OF THE DISCLOSURE

Video games and/or gaming applications and their related industries (e.g., video gaming) are extremely popular and represent a large percentage of the worldwide entertainment market. Development of video games involves the generation of one or more images in sequential order, wherein the images are set within a scene of a particular video game. Developing each scene may involve many steps to identify and create objects within the scene, and may further involve movement of the objects within the scene throughout multiple images. Each object may include intricate characteristics that define that object. For example, characteristics of an object may include size, shape, color, surface makeup, etc.

After an image or images of a scene have been developed, making changes to the characteristics of an object may also involve many intricate steps. For instance, the developer may have to individually change parameters of characteristics of an object that are changed, which can be time consuming. As a result, an object within an image will appear to have changed.

However, that change reflected in one object may not be consistent with other objects within the scene that is not changed. Additionally, it is difficult to make wholesale changes to a scene without redrawing the image from scratch. For example, wholesale changes to a scene may include changing an entire environment of the scene or changing a characteristic of the environment that would affect the entire scene or all the objects within the scene. In those cases, making a change to the environment would require redeveloping one or more images for the scene.

It is in this context that embodiments of the disclosure arise.

Embodiments of the present disclosure relate to image generation, such as during development of a video game, wherein an image is generated using an artificial intelligence (AI) image generation model implementing latent diffusion techniques. More specifically, modifications to an image are enabled by user feedback via commentary by a user. For example, the commentary may be provided in natural language, or may be provided through communication of likes and/or dislikes. The feedback provides for tuning of the image by forcing or guiding the artificial intelligence image generation model to a specific, desired outcome, such as a modified image.

In one embodiment, a method is disclosed. The method including generating an image using an image generation artificial intelligence system configured for implementing latent diffusion, wherein the image is decoded from a latent space representation. The method including receiving selection of a portion of the image. The method including receiving commentary of a user corresponding to the portion of the image. The method including generating a text prompt to modify the portion of the image based on the commentary. The method including encoding the portion of the image using latent diffusion based on the text prompt. The method including modifying the latent space representation of the image using latent diffusion to generate a modified image, wherein the text prompt and the encoded portion of the image are provided as input to the image generation artificial intelligence system.

In another embodiment, a non-transitory computer-readable medium storing a computer program for implementing a method is disclosed. The computer-readable medium including program instructions for generating an image using an image generation artificial intelligence system configured for implementing latent diffusion, wherein the image is decoded from a latent space representation. The computer-readable medium including program instructions for receiving selection of a portion of the image. The computer-readable medium including program instructions for receiving commentary of a user corresponding to the portion of the image. The computer-readable medium including program instructions for generating a text prompt to modify the portion of the image based on the commentary. The computer-readable medium including program instructions for encoding the portion of the image using latent diffusion based on the text prompt. The computer-readable medium including program instructions for modifying the latent space representation of the image using latent diffusion to generate a modified image, wherein the text prompt and the encoded portion of the image are provided as input to the image generation artificial intelligence system.

In still another embodiment, a computer system is disclosed, wherein the computer system includes a processor and memory coupled to the processor and having stored therein instructions that, if executed by the computer system, cause the computer system to execute a method. The method including generating an image using an image generation artificial intelligence system configured for implementing latent diffusion, wherein the image is decoded from a latent space representation. The method including receiving selection of a portion of the image. The method including receiving commentary of a user corresponding to the portion of the image. The method including generating a text prompt to modify the portion of the image based on the commentary. The method including encoding the portion of the image using latent diffusion based on the text prompt. The method including modifying the latent space representation of the image using latent diffusion to generate a modified image, wherein the text prompt and the encoded portion of the image are provided as input to the image generation artificial intelligence system.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 3 is a flow diagram illustrating a method for modifying an image generated using an AI image generation model implementing latent diffusion techniques based on commentary of a user providing feedback, in accordance with one embodiment of the present disclosure.

DETAILED DESCRIPTION

Figure 1:
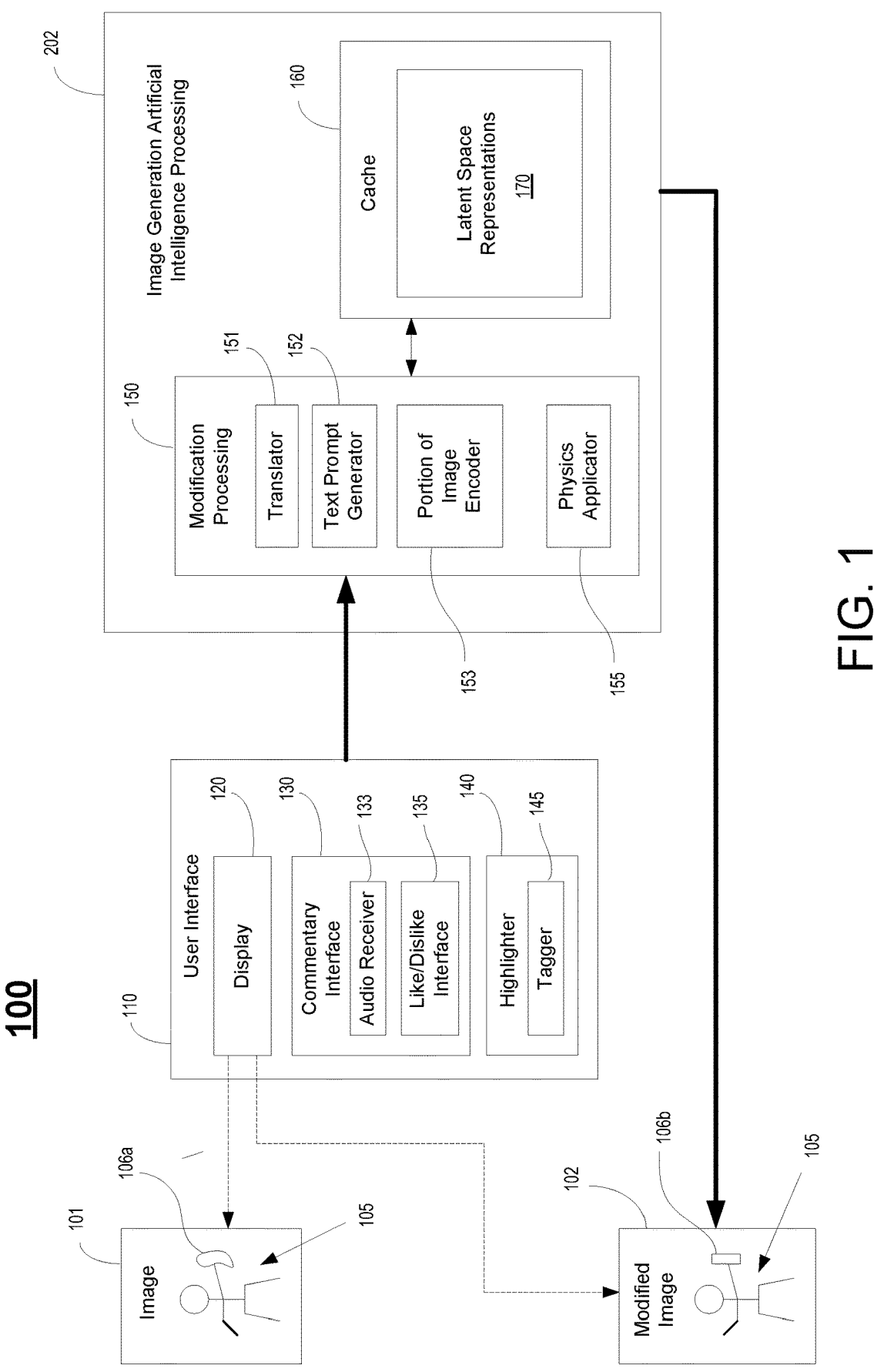
FIG. 1 illustrates a system configured for modifying an image generated using an AI image generation model implementing latent diffusion techniques based on commentary of a user providing feedback, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing for the modification of an image generated using an artificial intelligence (AI) generation model implementing latent diffusion techniques based on commentary of a user providing feedback. The image is initially generated using the AI image generation model based on an input (input image, input text, or combinations thereof), such as that provided by a user. Once the image is generated, a user interface enables the user to provide commentary in natural language regarding likes and dislikes in order to provide feedback. For example, the commentary can also be provided by voice of the user providing feedback. The natural language commentary can be for example, it looks pretty, needs better lighting, needs more-red, more-green, less of this, less of that, more of this, etc. In addition, the commentary providing modification to the image can be a simple thumbs up or thumbs down. The feedback is a type of tuning that allows the user to force or guide image generation to a specific desired outcome. The tuning can also be associated with specific parts of an image or images that are generated. For example, the UI can be used to allow a user to tag portions of an image for modification. In that case, the commentary providing the modification can be a simple thumbs up thumbs down to specific areas of an image or natural language commentary for that part of the image. For instance, if the generated image has a lot of mountains, the UI can allow the user to tag the mountains and say "fewer mountains" or some other descriptive commentary. In some embodiments, the tuning can be applied to multiple images, or a scene generated automatically for a game or a movie. For example, in a movie environment, certain scenes can be automatically generated or removed. For example, more love scenes, fewer love scenes, more fighting, less fighting, etc. In addition, an emotion of a user can also be considered when providing user feedback. For example, when commentary is provided by voice of the user providing feedback, if the user providing feedback is animated in the voice (e.g., sounding frustrated), the frustration can also be detected and used as an input.

Advantages of embodiments of the present disclosure include providing an intuitive way to change an image via a user interface to receive user input as feedback and view modifications to an image based on the feedback. The user interface may be configured to receive feedback inputs formatted in natural language thereby providing a user intuitive way for the user to provide feedback on an image being displayed through the user interface. In addition, other advantages include reducing the time to make a change to an image, or to a sequence of images of a scene within a video game under development. That is, the AI image generation model is configured to accept modifications to an image using vectors previously generated for the image and changing vectors based on the requested change. In that manner, the modification can be quickly generated while maintaining the heart of the image as originally generated. That is, the modified image provides a believable and true evolution of the original image. Another advantage provides for cascading a change of a portion of the image throughout the remaining portions of the image. Specifically, a physical property that is generated and/or modified for a requested change and/or modification is cascaded throughout the remaining portions of the image, such that the entire image is aligned with the physical property. For example, physics and/or physical laws of the physical property that is generated and/or modified would be applied to all objects in the image.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 configured for modifying an image generated using an AI image generation model implementing latent diffusion techniques based on commentary of a user providing feedback, in accordance with one embodiment of the present disclosure. For example, system 100 may be implemented during development of a video game, such as when developing one or more images of a scene.

As shown, the image generation AI (IGAI) processing model 202 is configured to generate an image based on user input using latent diffusion techniques. For example, the image is generated using input provided in various formats, such as text, or images, etc., as will be further described in FIGS. 2A-2C. In addition, the IGAI processing model 202 is configured to generate a modified image 102 based on user feedback corresponding to an original image 101, such as one generated by the IGAI processing model 202 based on user input. In that manner, an iterative process may be implemented to tune the original image through one or more rounds of providing user feedback to force or guide the IGAI processing model to a specific, desired outcome, such as a modified image. A more detailed description of the operations performed by the IGAI processing model 202 to generate an image based on user input is provided in FIGS. 2A-2C.

As shown, a user interface 110 is configured to facilitate implementing changes to an image 101 based on user feedback. In particular, the user interface may include a display 120 configured for displaying at a certain point in time an original image 101 that includes a person 105 holding a bag 106*a*. The person 105 may be in a first orientation for holding the bag 106*a*, wherein the arm of the person not holding the bag is orientated downwards.

After modifications to the image 101 have been made by the IGAI processing model 202, a modified image 102 may then be shown via display 120. The modified image 102 may include the person 105 holding a can 106*b* (e.g., aluminum can). The person 105 may be in a second orientation for holding the can 106*b*, wherein the arm of the person not holding the can is oriented upwards. Because of the operations implemented by the IGAI processing model 202, the orientation of the person may change. For example, a noise profile implemented by the IGAI processing model 202 may induce the change in the orientation of the person 105.

The user interface includes a commentary interface 130 configured to receive commentary from a user providing feedback. In particular, the commentary may be made in relation to viewing the original image 101. For example, the commentary may be feedback from the user with regards to the original image 101, wherein the feedback is used by the IGAI processing model 202 to generate a modified image responsive to the user feedback. Purely for illustration purposes, the feedback for the original image 101 may be to "change the bag to an aluminum can." Other examples of feedback may include the following: make it hotter by 10 degrees, make the sky redder, don't like the color of an object, etc.

For example, the commentary interface 130 may include an audio receiver 133 configured to receive audio commentary from the user. In that manner, the user may provide feedback using a natural language that is received by the user interface 110. In another example, a like/dislike interface 135 is configured for communicating likes and/or dislikes of the user. As such, the user may quickly provide a like and/or dislike for the original image 101, or with respect to a particular portion of the original image. Commentary interface 130 may be configured in any manner to receive and/or recognize commentary provided by the user. In that manner, the commentary interface 130 provides an intuitive way for the user to provide feedback, such as through voice, or via simple like and/or dislike communication icons.

In addition, the user interface may include a highlighter 140 that is configured for highlighting and/or selecting a specific portion of the image towards which the user is directing feedback. For purposes of illustration, the highlighter 140 may be text or audio driven where the user selects an object within the original image 101 to provide feedback, wherein the IGAI processing model 202 is configured to identify the object that is selected. In another embodiment, objects within the image may be previously identified, such as by the IGAI processing model 202 performing object classification on the original image 101, and displayed to the user. The user may be allowed to select a displayed object for directing the user feedback. In still another implementation, a tagger 145 may be configured for tagging objects within the image, such as by allowing the user to select and/or highlight an object for tagging, wherein feedback from the user is directed to the tagged object.

In still another embodiment, a context interface (not shown) is provided within the user interface, wherein the context interface is configured to allow the user to set and/or provide a context within which the feedback is provided. For example, the context provided by the user may apply to both the original image 101 and the feedback provided by the user. In another example, the context provided by the user may apply only to the feedback provided by the user, wherein the context of the original image may be different than the context provided by the user. As an illustration, a developer may be taking an image that was previously developed for a first video game directed to flying a plane, and use that image and the objects within that image for a second video game that is directed to car racing. As such, feedback provided by the user to induce modifications to the original image 101 may take into consideration the context. For example, changes to a character may be restricted to a car racing environment, such as not allowing the character to become too tall (i.e., not fitting within a cockpit of the car).

As shown, the IGAI processing model 202 includes one or more modification processing operations 150 that are implemented in cooperation with the user interface 110. That is, the modification processing operations 150 may be implemented to enable the IGAI processing model 202 to understand the feedback and format the feedback in a manner that allows for the generation of the modified image 102.

A translator 151 implements one of the modification processing operations 150, and is configured to translate the feedback into a format that is understandable to the IGAI processing model 202. For example, the feedback may be provided in a natural language format (e.g., a voice speaking a language), and may then be translated into text, or any other suitable format understood by the IGAI processing model 202.

In addition, a prompt generator 152 implements one of the modification processing operations 150, and is configured to convert the feedback that is translated into a prompt that can be provided as input to the IGAI processing model 202 to generate the modified image reflected of the feedback. For example, the format may be text. In one embodiment, the newly generated prompt may be isolated to the feedback and is sufficient to allow the IGAI processing model 202 to generate the modified image 102. For example, the prompt may correspond to the feedback provided by the user to change the bag 106*a* to an aluminum can 106*b*. In one embodiment, the prompt may include information obtained from the original prompt provided as input to generate the original image 101.

More particularly, to modify the original image 101 based on the feedback, the IGAI processing model 202 may act in latent space on the portion of the original image 101 towards which the feedback is directed. For example, a noise profile may be generated, predicted and/or encoded based on the portion of the original image 101 that is identified by the user using an image encoder 153 (i.e., that acts on the portion of the image identified), wherein the noise profile may be processed using latent diffusion by the IGAI processing model 202 to reflect the feedback. As such, a modified image may be generated, and includes for example a can 106*b* to be held by the person 106 in the modified image 102. In another implementation, the image encoder 153 is performed within the latent specification of the IGAI processing model 202, such as within a noise predictor or within the normal operations of the latent space.

In one embodiment, the physics applicator 155 implements one of the modification processing operations 150, and is configured to propagate a physical property corresponding to the feedback provided by the user and its effects across the entire image, including the highlighted portion of the image, and the remaining portions of the image. In particular, the feedback provided by the user may be directed to an object (i.e., a portion of the image). When effecting a change in the object based on the user feedback, a physical property (e.g., a law of physics corresponding to the object) may be identified, generated, and/or changed. In the example provided above to change the bag 106a to a can 106b, a physical property may be weight. That is, the can 106b may be heavier (e.g., a large steel can) or lighter (an aluminum can) than the bag 106a. The change in weight will affect how the object is being held by the person 105. For instance, if the can is heavier, then the arm of the person 105 holding the can may drop when compared to when holding the bag. In addition, the stance of the person 105 may change to balance the heavier can. On the other hand, if the can is lighter, then the arm holding the can may rise when compared to when holding the bag.

As another example, if the feedback is to a color of an object of the original image 101, then that change in color as a physical property may be propagated throughout image. For example, reflections of the new color may be evidenced by other objects. For instance, if the feedback is to make the sky redder, then reflections of the sky off building windows would be redder.

In still another example, the feedback may be to temperature of the environment, such as "make it hotter by 10 degrees." The physical property of the temperature would be propagated throughout the entire image. For instance, in a winter scene with snow and a snowman in a field, a rise in temperature may correspond to having the snowman visibly melting. In another instance, in an outdoor patio scene including a glass of ice, a rise in temperature may correspond to having the ice melt in the modified image.

In one embodiment, the generation of an output image, graphics, and/or three-dimensional representation by an image generation AI (IGAI), can include one or more artificial intelligence processing engines and/or models. In general, an AI model is generated using training data from a data set. The data set selected for training can be custom curated for specific desired outputs and in some cases the training data set can include wide ranging generic data that can be consumed from a multitude of sources over the Internet. By way of example, an IGAI should have access to a vast of amount of data, e.g., images, videos and three-dimensional data. The generic data is used by the IGAI to gain understanding of the type of content desired by an input. For instance, if the input is requesting the generation of a tiger in the Sahara desert, the data set should have various images of tigers and deserts to access and draw upon during the processing of an output image. The curated data set, on the other hand, may be more specific to a type of content, e.g., video game related art, videos and other asset related content. Even more specifically, the curated data set could include images related to specific scenes of a game or actions sequences including game assets, e.g., unique avatar characters and the like. As described above, an IGAI can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI can also be provided images, videos, or sets of images to define the context of an input request. In one embodiment, the input can be text describing a desired output along with an image or images to convey the desired contextual scene being requested as the output.

In one embodiment, an IGAI is provided to enable text-to-image generation. Image generation is configured to implement latent diffusion processing, in a latent space, to synthesize the text to image processing. In one embodiment, a conditioning process assists in shaping the output toward the desired using output, e.g., using structured metadata. The structured metadata may include information gained from the user input to guide a machine learning model to denoise progressively in stages using cross-attention until the processed denoising is decoded back to a pixel space. In the decoding stage, upscaling is applied to achieve an image, video, or 3D asset that is of higher quality. The IGAI is therefore a custom tool that is engineered to processing specific types of input and render specific types of outputs. When the IGAI is customized, the machine learning and deep learning algorithms are tuned to achieve specific custom outputs, e.g., such as unique image assets to be used in gaming technology, specific game titles, and/or movies.

In another configuration, the IGAI can be a third-party processor, e.g., such as one provided by Stable Diffusion or others, such as OpenAI's GLIDE, DALL-E, MidJourney or Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich titled "*High-Resolution Image Synthesis with Latent Diffusion Models*", by Robin Rombach, et al., pp. 1-45. This paper is incorporated by reference.

Figure 2A:
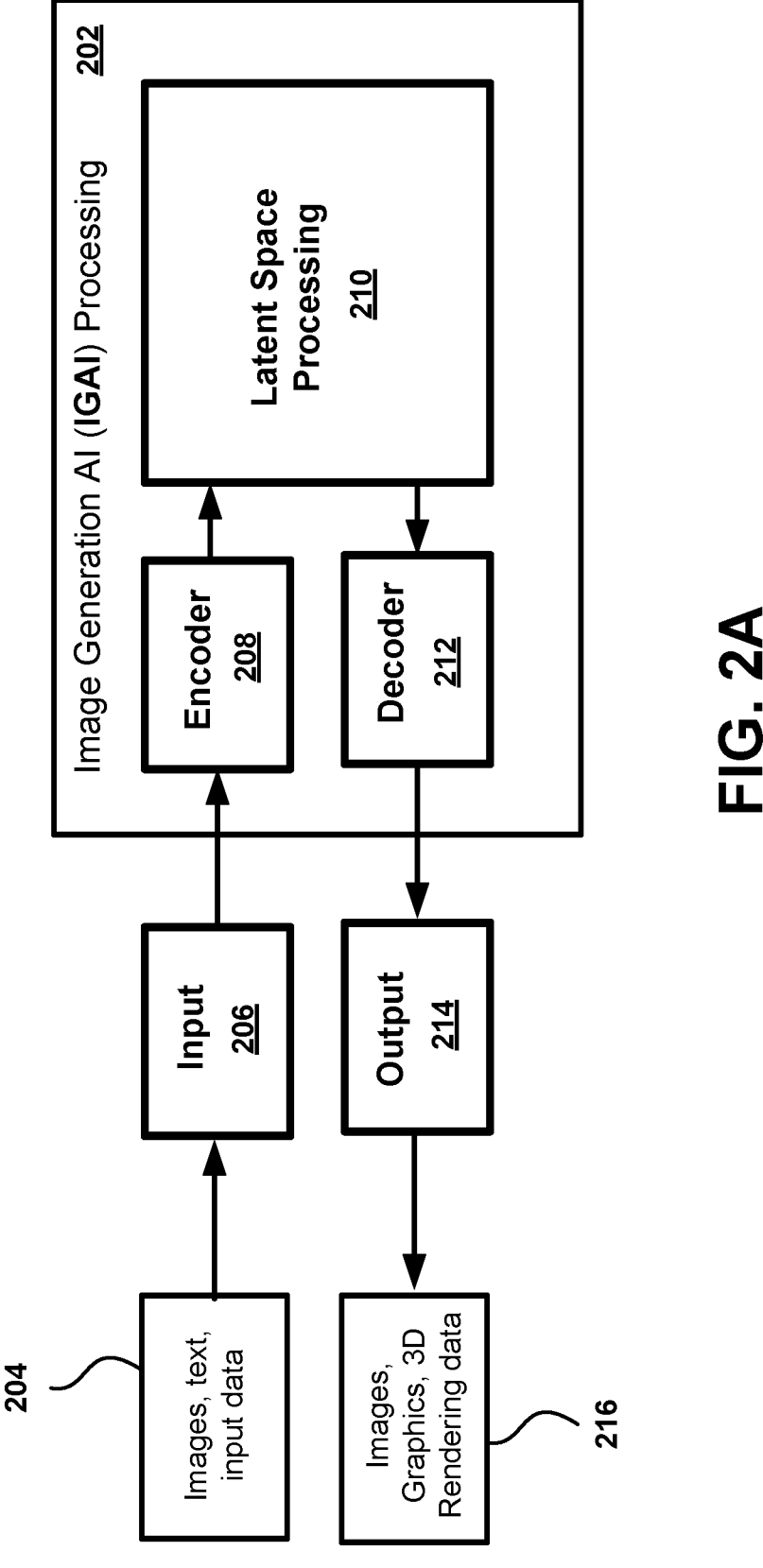
FIG. 2A is a general representation of an image generation AI (IGAI) processing sequence, in accordance with one embodiment.

FIG. 2A is a general representation of an image generation AI (IGAI) 202 processing sequence (also referred to as the IGAI processing model 202), in accordance with one embodiment. As shown, input 206 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In one embodiment, text description is enabled by contrastive learning. The basic idea is to embed both an image and text in a latent space so that text corresponding to an image maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings.

When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 206 is configured to convey the intent of the user that wishes to utilize the IGAI to generate some digital content. In the context of game technology, the target content to be generated can be a game asset for use in a specific game scene. In such a scenario, the data set used to train the IGAI and input 206 can be used to customized the way artificial intelligence, e.g., deep neural networks process the data to steer and tune the desired output image, data or three-dimensional digital asset.

The input 206 is then passed to the IGAI, where an encoder 208 takes input data and/or pixel space data and converts into latent space data. The concept of "latent space" is at the core of deep learning, since feature data is reduced to simplified data representations for the purpose of finding patterns and using the patterns. The latent space processing 210 is therefore executed on compressed data, which significantly reduces the processing overhead as compared to processing learning algorithms in the pixel space, which is much more heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 210, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents closely to what was requested via user input. A decoder 212 then transforms a resulting output from the latent space back to the pixel space. The output 214 may then be processed to improve the resolution. The output 214 is then passed out as the result, which may be an image, graphics, 3D data, or data that can be rendered to a physical form or digital form.

Figure 2B:
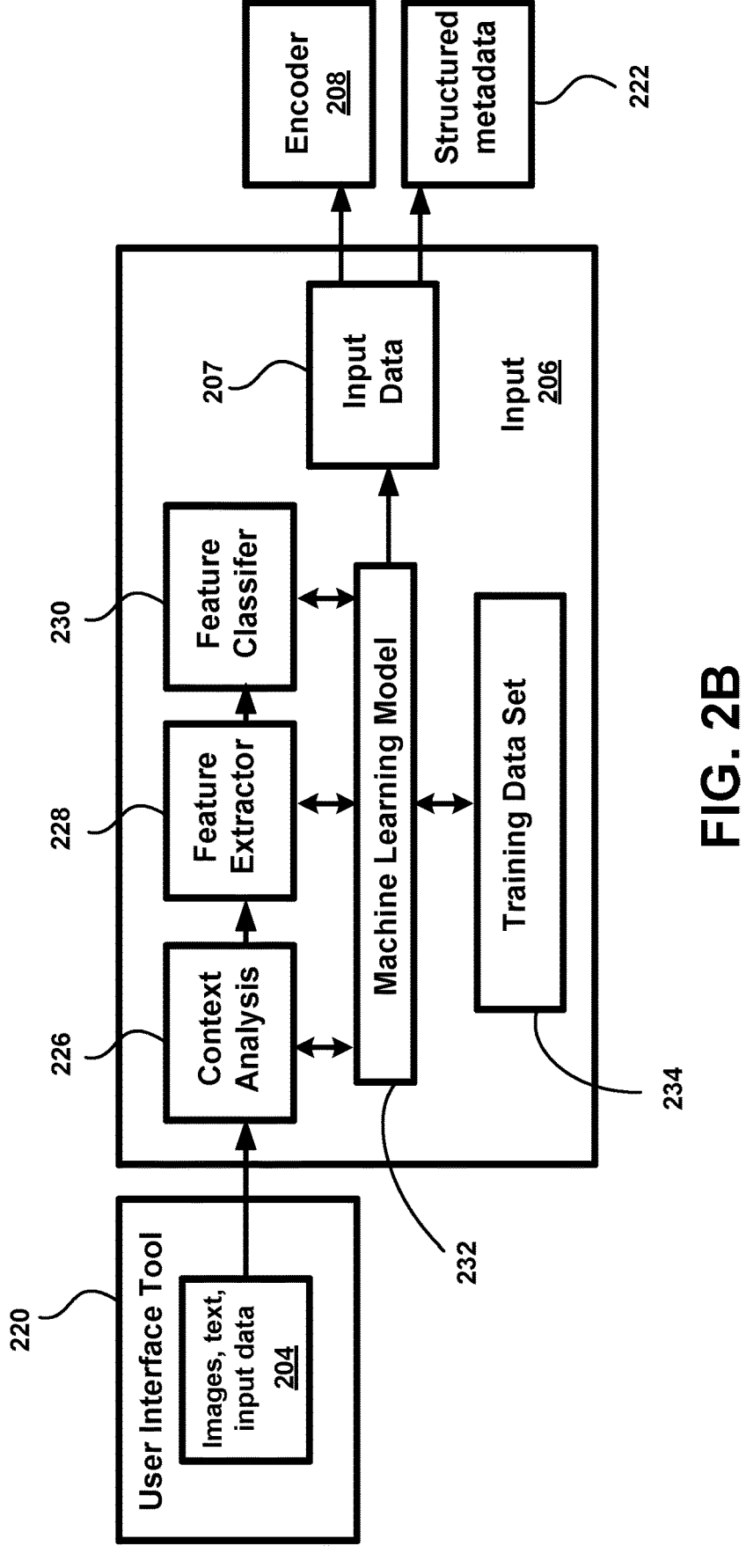
FIG. 2B illustrates additional processing that may be done to the input provided to the IGAI processing sequence described in FIG. 2A, in accordance with one embodiment of the present disclosure.

FIG. 2B illustrates, in one embodiment, additional processing that may be done to the input 206. A user interface tool 220 may be used to enable a user to provide an input request 204. The input request 204, as discussed above, may be images, text, structured text, or generally data. In one embodiment, before the input request is provided to the encoder 208, the input can be processed by a machine learning process that generates a machine learning model 232, and learns from a training data set 234. By way of example, the input data maybe be processed to via a context analyzer 226 to understand the context of the request. For example, if the input is "space rockets for flying to the mars", the input can be analyzed 226 to determine that the context is related to outer space and planets. The context analysis may use machine learning model 232 and training data set 234 to find related images for this context or identify specific libraries of art, images or video. If the input request also includes an image of a rocket, the feature extractor 228 can function to automatically identify feature characteristics in the rocket image, e.g., fuel tank, length, color, position, edges, lettering, flames, etc. A feature classifier 230 can also be used to classify the features and improve the machine learning model 232. In one embodiment, the input data 207 can be generated to produce structured information that can be encoded by encoder 208 into the latent space. Additionally, it is possible to extract out structured metadata 222 from the input request. The structured metadata 222 may be, for example, descriptive text used to instruct the IGAI 202 to make a modification to a characteristic or change to the input images or changes to colors, textures, or combinations thereof. For example, the input request 204 could include an image of the rocket, and the text can say "make the rocket wider" or "add more flames" or "make it stronger" or some of other modifier intended by the user (e.g., semantically provided and context analyzed). The structured metadata 222 can then be used in subsequent latent space processing to tune the output to move toward the user's intent. In one embodiment, the structured metadata may be in the form of semantic maps, text, images, or data that is engineered to represent the user's intent as to what changes or modifications should be made an input image or content.

Figure 2C:
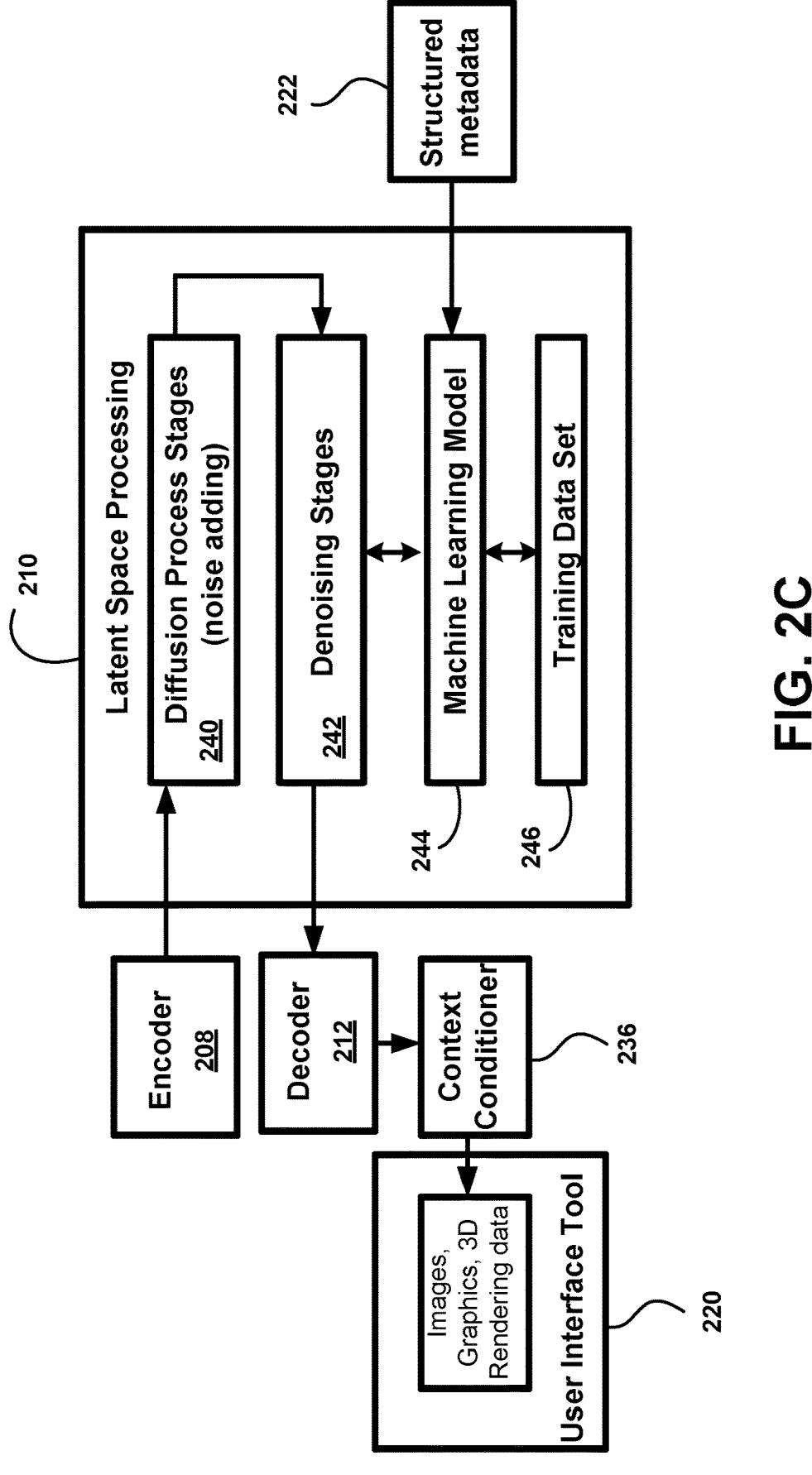
FIG. 2C illustrates how the output of the encoder used is then fed into latent space processing in the IGAI processing sequence, in accordance with one embodiment.

FIG. 2C illustrates how the output of the encoder 208 is then fed into latent space processing 210, in accordance with one embodiment. A diffusion process is executed by diffusion process stages 240, wherein the input is processed through a number of stages to add noise to the input image or images associated with the input text. This is a progressive process, where at each stage, e.g., 10-50 or more stages, noise is added. Next, a denoising process is executed through denoising stages 242. Similar to the noise stages, a reverse process is executed where noise is removed progressively at each stage, and at each stage, machine learning is used to predict what the output image or content should be, in light of the input request intent. In one embodiment, the structured metadata 222 can be used by a machine learning model 244 at each stage of denoising, to predict how the resulting denoised image should look and how it should be modified. During these predictions, the machine learning model 244 uses the training data set 246 and the structured metadata 222, to move closer and closer to an output that most resembles the requested in the input. In one embodiment, during the denoising, a U-Net architecture that has cross-attention layers may be used, to improve the predictions. After the final denoising stage, the output is provided to a decoder 212 that transforms that output to the pixel space. In one embodiment, the output is also upscaled to improve the resolution. The output of the decoder, in one embodiment, can be optionally run through a context conditioner 236. The context conditioner is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 244 gets smarter with more training over time, there will be less need for a context conditioner 236 before the output is rendered in the user interface tool 220.

With the detailed description of the system 100 of FIG. 1 and the image generation AI (IGAI) 202 processing sequence of FIGS. 2A-2C, flow diagram 300 of FIG. 3 discloses a method for modifying an image generated using an AI image generation model implementing latent diffusion techniques based on commentary of a user providing feedback, in accordance with one embodiment of the present disclosure. The operations performed in the flow diagram may be implemented by one or more of the previously described components, and also system 100 described in FIG. 1, including, in part, user interface 110, modification processing operations 150, and/or IGAI processing model 202. In particular, flow diagram 300 may be implemented to enable modification to an image, previously generated using the IGAI processing model, via commentary as feedback to the image that is provided by a user. Multiple iterations of providing feedback on multiple images that have been modified based on the feedback may provide for tuning of the image by forging or guiding the IGAI processing model to a specific, desired outcome (i.e., final resulting image that has been iteratively modified).

At 310, the method including generating an original image based on input provided to an image generation artificial intelligence system configured to implementing latent diffusion. For example, the image is generated by the IGAI processing model of FIGS. 1 and FIGS. 2A-2C. The input may be formatted in text, wherein the IGAI processing model is configured as a text to image processor. Generally, the IGAI processing model adds and removes noise from a noisy image or patch, wherein the noise patch is concatenated with a vector for conditioning (e.g., text instructions encoded into a latent vector). During latent diffusion, each step of denoising or encoding yields a new latent representation of the image of low resolution, with some amount of noise removed. The latent representation of the image is then decoded to generate a high resolution original image as output.

At 320, the method including receiving selection of a portion of the original image. In particular, feedback of the user may be directed to a specific portion of the original image, such as an object within the original image. In some implementations, the feedback may apply to the entire original image, or to multiple objects of the image. For example, the portion of the original image may be highlighted by circling or pointing to the portion within the image that is displayed. In another example, the portion of the original image may be selected through tagging. That is, the portion of the image is tagged by the user, which indicates selection of the portion of the original image as being targeted for user feedback.

At 330, the method including receiving commentary of a user corresponding to the portion of the original image. In particular, once the original image is generated, a user interface may be implemented to enable the user provide commentary regarding likes and dislikes in order to provide feedback directed to the portion of the original image that is selected.

For example, the commentary can also be provided by voice in a natural language of the user. As an illustration of feedback, the natural language commentary can be, for example: "it looks pretty," or "needs better lighting," or "needs more-red," or "more-green," or "fewer of this," or "fewer of that," or more of this," etc. In one embodiment, the commentary provided in a natural language format is translated into a text format, or to any format, that is readily understood by the IGAI processing model.

In another example, the commentary may be in the form of a like or dislike icon, or through any interface configured for communicating a like or dislike of the user. As such, a quick form of feedback may be provided by the user through the communication of a like and/or dislike for the selected portion of the original image.

At 340, the method including generating a text prompt to modify the portion of the original image based on the commentary. The prompt is generated in a manner that is understood by the IGAI processing model. As previously described, the newly generated prompt may be isolated from the original prompt used to generate the original image towards which feedback is provided. In another implementation, the newly generated prompt may be combined with at least some portions of the original prompt used to generate the original image. In general, the newly generated prompt instructs the IGAI processing model (e.g., via an input of the prompt) to modify the portion the original image based on the feedback provided by the user, and as communicated via the prompt. Further, the original image is entirely modified based on the text prompt in alignment with the modified portion.

In one embodiment, the text prompt and/or feedback is provided via manipulation of a word cloud corresponding to the selected portion of the image, such as via a user interface. The word cloud may be a visual representation of data, such as text data, that represents the selected portion of the image. In particular, at least one modification to the word cloud is received via the user interface. The modification may be provided via any suitable technique, such as a text box allowing for change instructions, or a resizing interface that indicates the word should be highly emphasized when increasing a size of a corresponding word in the word cloud, or that indicates that the word should be lightly considered when decreasing the size of the corresponding word. The text prompt is then generated based on the word cloud that is modified.

For example, the word cloud may be displayed in the user interface, wherein the word cloud includes multiple words corresponding to the selected portion of the image. The user interface provides for selection of a word in the word cloud. Upon selection of a word in the word cloud (i.e., receiving selection of the word), a drop down menu of items may be provided. In particular, the items listed corresponding to various actions that may be performed in relation to the word that is selected that reflects a change or modification to that word. In particular, wherein selection of each item in the menu of items applies a corresponding modification to the word that is selected.

At 350, the method including encoding the portion of the original image using latent diffusion based on the text prompt. That is, latent diffusion is performed only on the portion of the original image selected by the user. For example, the portion of the image can be an object. Latent diffusion may be performed on a noisy version of the portion of the original image.

At 360, the method including modifying the latent space representation of the original image using latent diffusion to generate a modified image. In particular, the text prompt and the encoded portion of the original image are provided as input to the image generation artificial intelligence system. In one embodiment, latent diffusion is performed on the last latent space representation of the original image, such as when looping through a diffusion model to generate the last version of the latent space representation of the original image. For example, one or more latent space representations of the original image that are generated when performing latent diffusion may be cached. In another embodiment, the original image itself is used to generate a noisy version upon which latent diffusion is performed based on the text prompt and the encoded portion of the original image. As such, the latent space representation of the image is modified using latent diffusion in response to the user feedback of the user that corresponds to the text prompt.

In particular, because the encoded portion of the image is provided as a conditioning factor when generating the input provided to the image generation artificial intelligence system (e.g., concatenating the text prompt configured as a latent vector with the encoded portion of the image, and/or a noisy and low resolution representation of the image), other portions of the original image will be modified in alignment with the modifications made to the portion of the original image when performing latent diffusion. That is, the conditioning factor used is key to obtaining a modified image that is in alignment with the feedback provided by the user. Specifically, the conditioning factor allows for conditioning the changes of other objects in the original image based on the result of conditioning a specific object change (e.g., modifications to the portion of the image) in response to the text prompt generated from the user feedback. For example, the text prompt that caused the modification to the portion of the image (e.g., updated portion of the image or object) is provided and/or concatenated with the encoding of the updated portion of the image (e.g., object) and applied to the other portions of the image (e.g., other objects) in the original image when performing latent diffusion. In that manner, the other portions of the original image (e.g., other objects) can take into account the changes that were made to the portion of the original image (e.g., object) selected for modification when performing latent diffusion, such as when performing denoising or encoding to generate another iteration of the latent representation of the now modified image. In summary of the operations previously described, the IGAI processing model performs noising, denoising, and/or decoding operations to generate the modified image in response to the user feedback of the user and that corresponds to the text prompt that is generated.

In one embodiment, a user interface facilitates interaction with the user providing feedback. For example, the user interface may be configured to display the image and/or the modified image to the user. In that manner, the user is able to visualize the image in order to understand what modifications can be made, as reflected in the feedback. Also, the user interface may be configured for highlighting a portion of the image, wherein the highlighting indicates a selection of the portion of the image. In one implementation, the highlighting is provided through a tagging mechanism, wherein the user interface provides for tagging of the selected portion of the image. Further, the user interface may be configured to receive the commentary of the user. For example, the commentary may be provided by natural language, or a voice of the user, wherein the user interface may include an audio receiver or an interface to an audio receiver. In another example, the user interface may include an interface for communicating likes and/or dislikes with respect to the selected portion of the image.

In one embodiment, the feedback provided by the user is directed to a portion of an image, such as an object within the image. The feedback may be associated with a change to, or the generation of a physical property of that portion of the image, such as an object in the image. For example, the physical property of the selected portion of the image (e.g., object) is changed based on the prompt generated in response to the feedback. While the IGAI processing model directly may change the presentation of the portion of the image based on the feedback of the user, the IGAI processing model may also propagate the change to the physical property (e.g., a law of physics that applies to the selected portion of the image, such as an object) across the entire image, including remaining portions of the image, as previously described.

Figure 4:
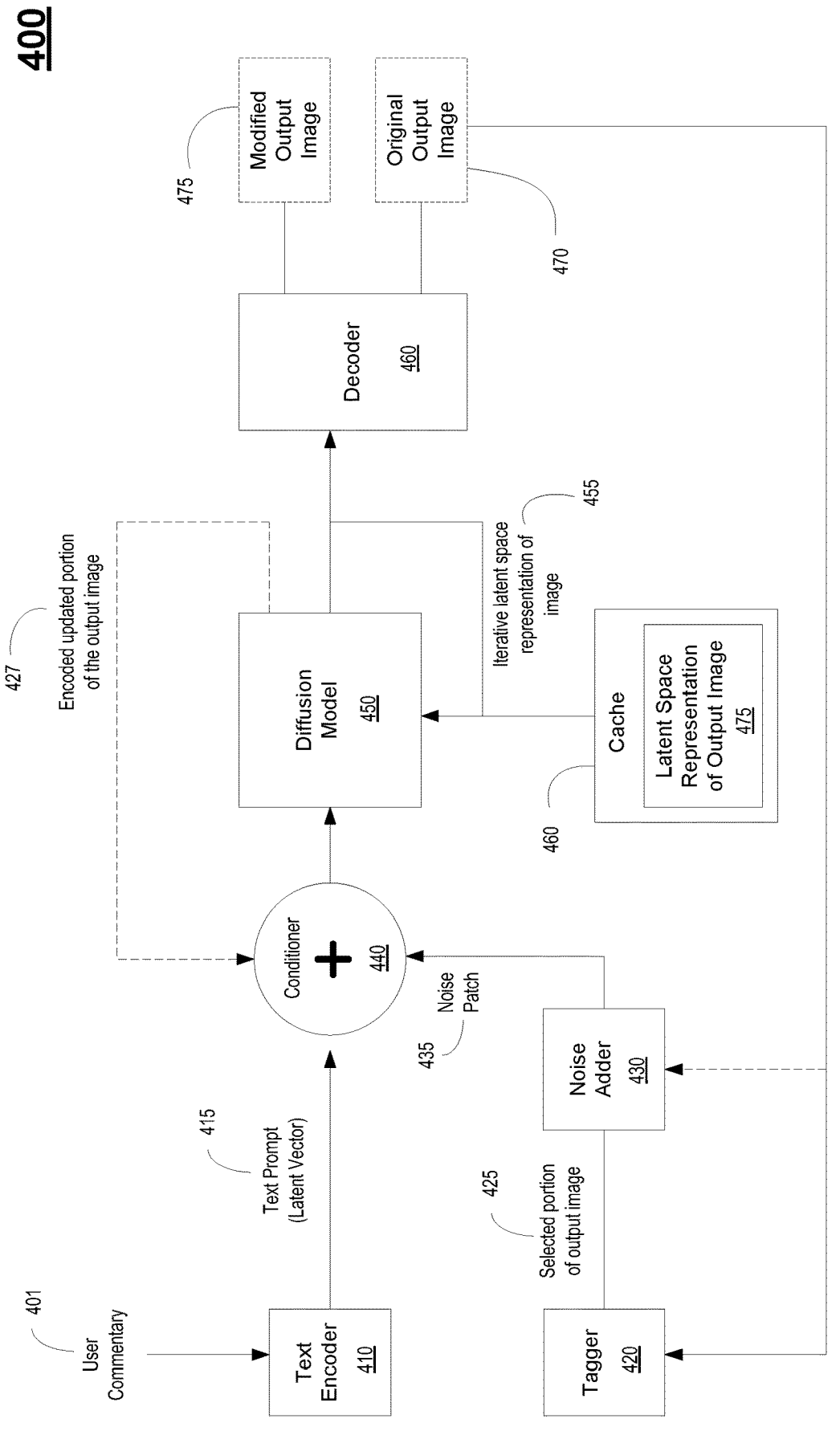
FIG. 4 is a diagram illustrating the flow of data when modifying an image based on commentary of a user providing feedback, in accordance with one embodiment of the present disclosure.

FIG. 4 is a data flow diagram 400 illustrating the flow of data when modifying an original image 470 based on commentary 401 of a user providing feedback, in accordance with one embodiment of the present disclosure. For example, latent diffusion techniques are used to generate an original image 470, for example provided as output by an IGAI processing model. As previously described, latent diffusion is the process of adding and removing noise to generate the image. For example, a desired image can be generated from a noise patch concatenated with a vector (e.g., text encoded into a latent vector) for conditioning, wherein the vector defines the parameters by which the image is constructed using latent diffusion. Multiple steps of noising and denoising may be performed iteratively by the diffusion model when processing the original image 470, wherein at each step the diffusion model 450 outputs an iterative latent space representation 455 of the original image. Throughout the implementation of latent diffusion by a diffusion model 450, one or more latent space representations 475 of the image (e.g., when processing the original image 470), such as those generated when denoising the noise patch based on the vector, may be stored in cache 455. The last iteration performed by the diffusion model generates the last latent space representation, which is then decoded by decoder 460 to generate the original image 470, provided as output.

As previously described, a user may provide commentary 401 that is directed to a selected portion 425 of the output image 470. For example, a tagger 420 may be implemented to automatically identify the selected portion 425, or is configured for interaction by the user to identify the selected portion 425. As shown, the user commentary 401 is encoded by an encoder 410 into a text prompt 415. In addition, the encoder 410 may convert the text prompt into a latent vector for purposes of performing latent diffusion. In one implementation, a noise adder 430 is configured to process the selected portion 425 of the output image 470 and generate a noise patch 435, and/or a noisy version of the selected portion 425. In another implementation, the noise patch is randomly generated. In another implementation, a portion of the last latent space representation of the original image is identified as corresponding to the selected portion, and is used when performing latent diffusion. For example, the noise adder 430 may be configured to identify the corresponding portion of the last latent space representation of the original image, or the diffusion model 450 may be configured to perform the identification. As such, the noise patch 435 may be randomly generated, based on the selected portion 425 of the or original image, or be based on the last latent space representation (e.g., the corresponding portion of the last latent space representation of the original image). The noise patch 435 that corresponds to the selected portion 425 of the output image 470 is concatenated with the text prompt 415 (i.e., latent vector) as a first set of conditioning factors by the conditioner 440 that is provided as input into the diffusion model 450. Latent diffusion is performed to process and/or generate (e.g., encode or denoise) a modified or updated portion 427 of the original image 475 based on the first set of conditioning factors. The modified or updated portion of the original image 475 is encoded, such as into a latent space representation. As such, the encoded, modified or updated portion 427 of the original image 475 reflects the feedback provided by the user in the commentary 401 (e.g., make sky more red, change object to a soda can, etc.).

Rather than decoding the encoded, modified or updated portion 427 of the original image 475, the encoded, modified or updated portion 427 is provided back to the conditioner 440 to generate a second set of conditioning factors. In particular, changes to be made using latent diffusion on remaining portions of the original image 470 (i.e., not selected) are conditioned upon or are based on the result of conditioning the selected portion 425 of the original image 470 (i.e., the encoded, modified or updated portion 427) using a concatenated prompt. For example, the encoded, modified or updated portion 427 is, in part, concatenated with the text prompt 415 (or latent vector) that caused the change or modification to the selected portion 425 of the original image 470, to generate a second set of conditioning factors (e.g., a second latent vector). In one implementation, this second set of conditioning factors is then provided to the diffusion model 450 to perform latent diffusion on the last latent space representation of the original image 470 (i.e., the version that is decoded to generate the original image 470) in order to change and/or modify, in part, the other portions of the original image 470 (i.e., not selected) to be consistent with changes and/or modifications made to the selected portion 425 (i.e., corresponding to the encoded, updated portion 427). For example, the diffusion model 450 may add noise to the last latent space representation of the original image 470 (i.e., the version that is decoded to generate the original image 470) in order to perform latent diffusion (i.e., denoising) based on the second set of conditioning factors. In another implementation, the second set of conditioning factors includes a noisy version of the last latent space representation of the image (i.e., decoded to generate the original image 470) that may be generated by the noise adder 430. As a technical summary, the text prompt 415 (i.e., latent vector), that caused the change or modification to the selected portion 425, is provided with an encoding of the updated object (e.g., the encoded, updated portion 427) for purposes of performing latent diffusion by the diffusion model 450 on at least the remaining portions of the original image 470 (i.e., the non-selected portions). In some implementations, the diffusion model 450 performs latent diffusion on the entire original image 470 (i.e., that is encoded), but makes minimal or no changes to the already modified selected portion 425. In that manner, the remaining portions can be aligned with, or take into account, the changes and/or modifications that were made to the selected portion 425 of the original image 470 (i.e., corresponding to the encoded, updated portion 427). As such, the diffusion model generates another latent space representation of the image, now modified, and after decoding, the decoder 460 outputs the modified image 475. Further comments may be made by the user on the modified image 475 so that an iterative process may be performed by the user to achieve a desired and final or resulting image.

In another embodiment, another process is performed to determine a difference (a difference vector in latent space) between the modified or updated portion 427, that may or may not be encoded, and the selected portion 425 of the original image 427, without any modification. This difference can be used as a conditioner for the remaining portions (e.g., remaining objects) of the original image 470 (i.e., not selected and not modified). For example, color may be used to determine a difference. That is, a difference between values for the red, green, and blue channels (i.e., r, g, and b channels) corresponding to the selected portion 425 (e.g., original object) of the original image 427 and the modified or updated portion 427 may be determined. The difference can be encoded into a latent representation, wherein the encoded latent representation may be used as a conditioner for the remaining portions (e.g., remaining objects) of the original image 470 (i.e., not selected and not modified) for updating in alignment and consistent with the changes and/or modifications made in the encoded, modified or updated portion 427. That is, the encoded latent representation is concatenated with the text prompt 415 (or latent vector) that caused the change or modification to the selected portion 425 of the original image 470, to generate a third set of conditioning factors (e.g., a third latent vector).

Figure 5:
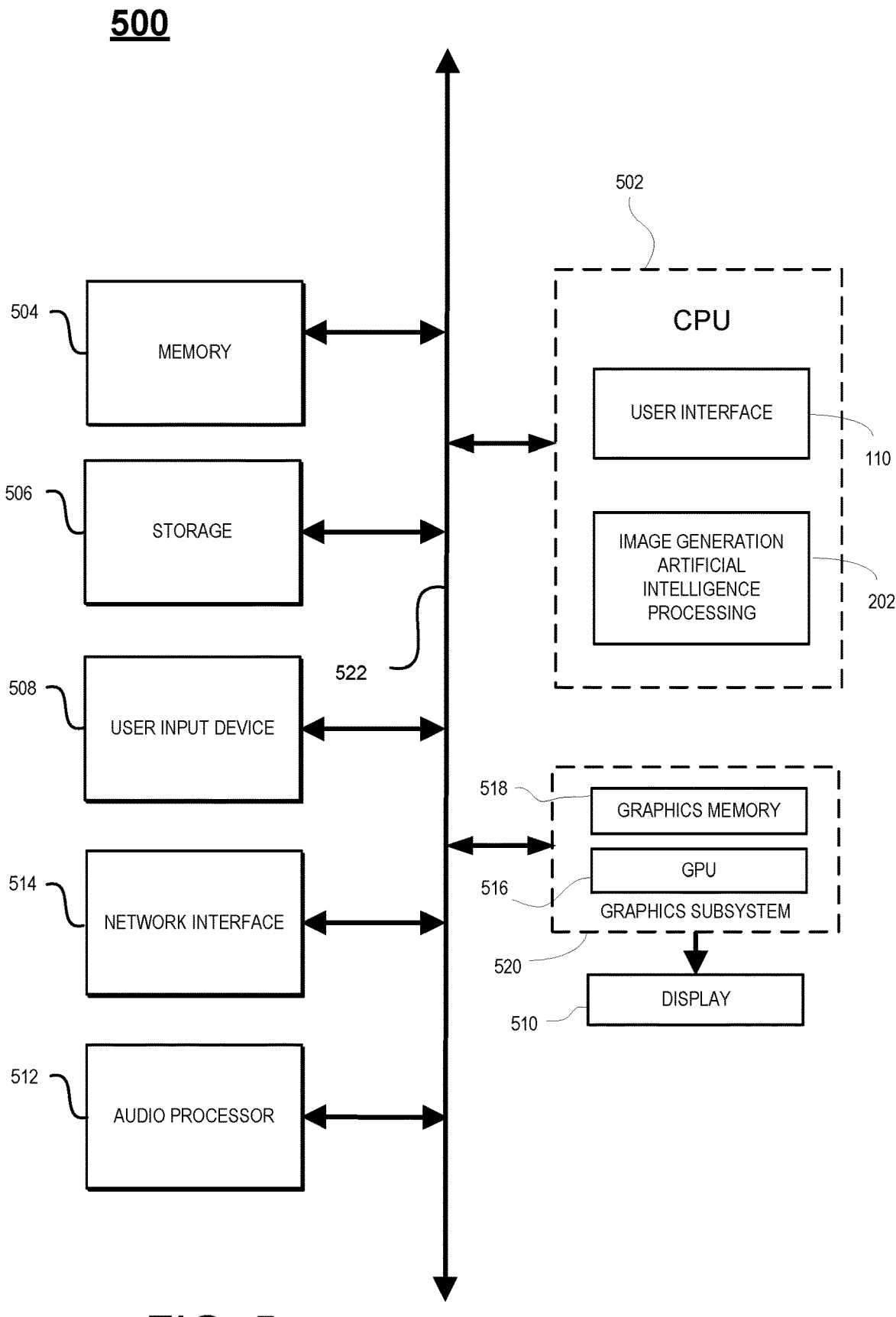
FIG. 5 illustrates components of an example device that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be a localized to a player playing a game segment (e.g., game console), or remote from the player (e.g., back-end server processor), or one of many servers using virtualization in a game cloud system for remote streaming of gameplay to clients, or for implementing additional services such as a supervisor functionality.

In particular, CPU 502 may be configured to implement a IGAI processing model 202 configured to enable modification to an image originally generated using latent diffusion techniques (such as by the same or different IGAI processing model) via commentary by a user providing feedback. The feedback provides for iterative tuning of the image by forcing or guiding the implementation of the latent diffusion techniques to a specific, desired outcome (i.e., the resulting image generated through iteratively generated modified images). In one embodiment, the CPU 502 may be configured to implement a user interface 110 that is configured to facilitate the enablement of modification of the image. For example, the user interface 110 may be configured to display the original and/or modified image, to highlight a portion of the image being displayed for selection, to tag the selected portion of the image, to receive commentary of the user as feedback (e.g., in the form of natural language, or communication of likes and/or dislikes), etc.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs. In one embodiment, GPU 516 may be implemented within an AI engine (e.g., machine learning engine 190) to provide additional processing power, such as for the AI, machine learning functionality, or deep learning functionality, etc.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

In other embodiments, the graphics subsystem 520 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for providing modification of an image generated using an IGAI processing model implementing latent diffusion techniques based on commentary of a user providing feedback.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include $5^{th}$ Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD- ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
receiving selection of a first portion of an image, wherein the image is decoded from a latent space representation of the image;
receiving user input corresponding to the first portion of the image;
identifying at least one scene physics property associated with the first portion of the image;
modifying the latent space representation of the image by:
modifying the latent space representation of the image corresponding to the first portion of the image based on the user input and the at least one scene physics property; and
responsive to modifying the latent space representation of the image corresponding to the first portion, automatically modifying the latent space representation of the image corresponding to a second portion of the image based on modifications to the latent space representation of the first portion of the image, wherein the second portion is distinct from the first portion, and wherein the modification to the latent space representation corresponding to the second portion is in accordance with the at least one scene physics property; and
decoding the modified latent space representation of the image to generate a modified image,
wherein the modified image includes one or more modifications to the second portion of the image.

2. The method of claim 1, wherein the receiving the user input includes:
receiving the user input formatted in a natural language; and
translating the user input into a text format.

3. The method of claim 1, wherein the user input includes:
receiving an indication of positive preference or negative preference associated with the first portion of the image.

4. The method of claim 1,
wherein the first portion of the image is tagged using the user input to indicate the selection of the first portion of the image.

5. The method of claim 1, further comprising:
displaying the image in a user interface; and
providing for tagging of the first portion of the image to indicate the selection of the first portion of the image;
receiving the user input via the user interface; and
displaying the modified image in the user interface.

6. The method of claim 1, further comprising:
changing a scene physics property of the first portion of the image based on a text prompt; and
applying the scene physics property that is changed throughout remaining portions of the image.

7. The method of claim 1, further comprising:
providing a word cloud corresponding to the first portion of the image in a user interface; and
receiving at least one modification to the word cloud via the user interface,
wherein a text prompt is generated based on the word cloud that is modified.

8. The method of claim 7, further comprising:
receiving selection of a word in the word cloud; and
providing a drop down menu of items corresponding to the word that is selected,
wherein selection of each item in the menu of items applies a corresponding modification to the word that is selected.

9. A non-transitory computer-readable medium storing instructions that, upon execution on a computer system, cause the computer system to perform operations comprising:
receiving selection of a first portion of an image, wherein the image is decoded from a latent space representation of the image;
receiving user input corresponding to the first portion of the image;
identifying at least one scene physics property associated with the first portion of the image;
modifying the latent space representation of the image by:
modifying the latent space representation of the image corresponding to the first portion of the image based on the user input and the at least one scene physics property; and
responsive to modifying the latent space representation of the image corresponding to the first portion, automatically modifying the latent space representation of the image corresponding to a second portion of the image based on modifications to the latent space representation of the first portion of the image, wherein the second portion is distinct from the first portion, and wherein the modification to the latent space representation corresponding to the second portion is in accordance with the at least one scene physics property; and
decoding the modified latent space representation of the image to generate a modified image,
wherein the modified image includes one or more modifications to the second portion of the image.

10. The non-transitory computer-readable medium of claim 9, storing further instructions that upon execution on the computer system cause the computer system to perform further operations comprising:
receiving the user input formatted in a natural language; and
translating the user input into a text format.

11. The non-transitory computer-readable medium of claim 9, storing further instructions that upon execution on the computer system cause the computer system to perform further operations comprising:

receiving an indication of positive preference or negative preference associated with the first portion of the image.

12. The non-transitory computer-readable medium of claim 9, storing further instructions that upon execution on the computer system cause the computer system to perform further operations comprising:

displaying the image in a user interface; and providing for tagging of the first portion of the image to indicate the selection of the first portion of the image;

receiving the user input via the user interface; and displaying the modified image in the user interface.

13. The non-transitory computer-readable medium of claim 9, storing further instructions that upon execution on the computer system cause the computer system to perform further operations comprising:

changing a scene physics property of the first portion of the image based on a text prompt; and applying the scene physics property that is changed throughout remaining portions of the image.

14. The non-transitory computer-readable medium of claim 9, storing further instructions that upon execution on the computer system cause the computer system to perform further operations comprising:

providing a word cloud corresponding to the first portion of the image in a user interface; and receiving at least one modification to the word cloud via the user interface, wherein a text prompt is generated based on the word cloud that is modified.

15. A computer system comprising:

a processor;

memory coupled to the processor and having stored therein instructions that, upon execution by the processor, configure the computer system to:

receive selection of a first portion of an image, wherein the image is decoded from a latent space representation of the image;

receive user input corresponding to the first portion of the image;

identify at least one scene physics property associated with the first portion of the image;

modify the latent space representation of the image by:

modify the latent space representation of the image corresponding to the first portion of the image based on the user input and the at least one scene physics property; and responsive to modifying the latent space representation of the image corresponding to the first portion, automatically modify the latent space representation of the image corresponding to a second portion of the image based on modifications to the latent space representation of the first portion of the image, wherein the second portion is distinct from the first portion, and wherein the modification to the latent space representation corresponding to the second portion is in accordance with the at least one scene physics property; and decode the modified latent space representation of the image to generate a modified image, wherein the modified image includes one or more modifications to the second portion of the image.

16. The computer system of claim 15, wherein the memory stores further instructions that, upon execution by the processor, further configure the computer system to:

receive the user input formatted in a natural language; and translate the user input into a text format.

17. The computer system of claim 15, wherein the memory stores further instructions that, upon execution by the processor, further configure the computer system to:

receive an indication of positive preference or negative preference associated with the first portion of the image.

18. The computer system of claim 15, wherein the memory stores further instructions that, upon execution by the processor, further configure the computer system to:

display the image in a user interface; and provide for tagging of the first portion of the image to indicate the selection of the first portion of the image;

receive the user input via the user interface; and display the modified image in the user interface.

19. The computer system of claim 15, wherein the memory stores further instructions that, upon execution by the processor, further configure the computer system to:

change a scene physics property of the first portion of the image based on a text prompt; and apply the scene physics property that is changed throughout remaining portions of the image.

20. The computer system of claim 15, wherein the memory stores further instructions that, upon execution by the processor, further configure the computer system to:

provide a word cloud corresponding to the first portion of the image in a user interface; and provide at least one modification to the word cloud via the user interface, wherein a text prompt is generated based on the word cloud that is modified.

* * * * *